Patented Apr. 9, 1946

2,398,081

UNITED STATES PATENT OFFICE 2,398,081

METHOD OF MAKING SOLUBLE CONCENTRATES OF COFFEE

Clinton W. Carter, Allison Park, Pa.

No Drawing. Application July 17, 1942,
Serial No. 451,261

4 Claims. (Cl. 99—71)

This invention relates to a method of preparing coffee solubles with sweetening and/or cream, and it is among the objects thereof to provide coffee soluble compounds in a dry powdered form which can be packaged in compact containers or in bulk and which are sterile and free of contaminating bacteria.

The invention contemplates mixing a liquid coffee extract with cream and/or evaporated milk with small amounts of dextrose and/or sugar to produce a creamed coffee beverage.

The cream and evaporated milk may be compounded with the coffee extract as a liquid or in the dry soluble state, and the mixture is dehydrated by heat to form a homogeneous dry soluble compound, a spoonful of which, when dissolved in boiling water, will produce a cup of creamed coffee beverage.

I have discovered that a coffee soluble of a highly desirable beverage quality can be produced by mixing two parts of the coffee extract of a specific gravity of 1.120 to 1.160 with one part fresh cream and one part evaporated milk.

While I have found that a suitable concentrate may be produced from the extract of a specific gravity between 1.120 and 1.160, I prefer to employ the extract at a specific gravity of 1.130 to bring out the desirable flavor and body in the beverage.

The mixture of the extract, cream and evaporated milk is concentrated by precipitation in a drying atmosphere to form the dry soluble.

Sugar may be added to the liquid mixture in an amount of 6½ pounds to a gallon of the mixed liquid extract, cream and milk, and when added the sugar is first dissolved in the liquid coffee extract before the milk is added. This forms an emulsion of the butter fats with the liquid and prevents the formation of lumps and/or separation of the fatty substances.

To the same effect, where sweetening is not desired, I utilize a small amount of dextrose to produce the emulsion in the amount of 3 pounds of dextrose to a gallon of the coffee extract. This has a very slight sweetening effect which is, however, not noticeable.

I have also found that a coffee soluble in the dry form can be mixed with cream and then precipitated in a heated drying atmosphere to form a creamed coffee soluble. In this manner, double the quantity of sweet cream can be mixed with the coffee soluble without the addition of sugar or dextrose. If only sweet cream is used with the liquid coffee extract, the mixture becomes too thin and for this reason it is better to use one part of fresh cream and one part of evaporated milk. I have, therefore, found it desirable to use the dry coffee soluble where only sweet cream is to be added as that results in a rather viscous liquid which can be readily concentrated by precipitation and heating to the dry form.

Concentrates produced as herein described may be preserved indefinitely in sealed containers and will be preserved under any atmospheric conditions. It may also be packaged as unit servings in small impervious envelopes or bags.

An advantage of producing dry coffee and cream solubles, sweetened or unsweetened, is that such may be made available for use in military camps and for shipment to distant points without utilizing any appreciable space compared to the bulk coffee and cream from which the product is made.

Although several embodiments of the invention have been herein illustrated and described, it will be evident to those skilled in the art that various modifications may be made in the details of construction without departing from the principles herein set forth.

I claim:

1. The method of making a coffee and cream soluble compound which comprises mixing two parts of liquid coffee extract of a specific gravity of 1.120 to 1.160 with one part fresh cream and one part evaporated milk and concentrating the mixture by precipitation in a heated atmosphere to form a dry beverage soluble.

2. The method of making a coffee and cream soluble compound which comprises mixing two parts of liquid coffee extract of a specific gravity of 1.130 with one part fresh cream and one part evaporated milk and concentrating the mixture by precipitation in a heated atmosphere to form a dry beverage soluble.

3. The method of making a coffee and cream soluble compound which comprises mixing two parts of liquid coffee extract of a specific gravity of 1.120 to 1.160 with sugar in the proportion of 6½ pounds sugar per gallon of the liquid extract, mixing the sweetened solution with one part fresh cream and one part evaporated milk and concentrating the mixture by precipitation in a heated atmosphere to form a dry beverage soluble.

4. The method of making a coffee and cream soluble compound which comprises mixing two parts of liquid coffee extract of a specific gravity of 1.120 to 1.160 with dextrose in the proportion of 3 pounds of dextrose per gallon of the liquid extract, mixing the solution with one part fresh cream and one part evaporated milk and concentrating the mixture by precipitation in a heated atmosphere to form a dry beverage soluble.

CLINTON W. CARTER.